United States Patent
Pering et al.

(10) Patent No.: US 9,662,569 B2
(45) Date of Patent: May 30, 2017

(54) SENSOR FUSION TO COMBINE SENSOR INPUT DATA FROM MULTIPLE DEVICES INTO ONE INPUT STREAM

(75) Inventors: Trevor Pering, San Francisco, CA (US); Roy Want, Los Altos, CA (US); Kenton M. Lyons, San Jose, CA (US); Barbara Rosario, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 487 days.

(21) Appl. No.: 12/347,949

(22) Filed: Dec. 31, 2008

(65) Prior Publication Data

US 2010/0271302 A1 Oct. 28, 2010

(51) Int. Cl.
*A63F 13/212* (2014.01)
*G06F 3/01* (2006.01)
*G06F 3/0346* (2013.01)
*G06F 3/038* (2013.01)

(52) U.S. Cl.
CPC ............ *A63F 13/212* (2014.09); *G06F 3/011* (2013.01); *G06F 3/0346* (2013.01); *G06F 3/0383* (2013.01); *A63F 2300/105* (2013.01); *A63F 2300/1012* (2013.01); *A63F 2300/6045* (2013.01); *G06F 2203/0382* (2013.01); *G06F 2203/0384* (2013.01)

(58) Field of Classification Search
CPC .................. A63F 13/02; A63F 2300/10; A63F 2300/1006; A63F 2300/1012; A63F 2300/1025; A63F 2300/1031; A63F 2300/105; A63F 2300/6045; A63F 13/212; G06F 3/011; G06F 3/0346; G06F 3/0383; G06F 2203/0382; G06F 2203/0384

USPC ............................................ 463/7, 36, 37, 39
See application file for complete search history.

(56) References Cited

U.S. PATENT DOCUMENTS

| | | | |
|---|---|---|---|
| 6,008,777 A * | 12/1999 | Yiu | 345/2.1 |
| 6,227,974 B1 * | 5/2001 | Eilat et al. | 463/40 |
| 6,445,364 B2 * | 9/2002 | Zwern | 345/8 |
| 2003/0071787 A1 * | 4/2003 | Gerstacker | G06F 3/0334 345/163 |
| 2005/0108439 A1 * | 5/2005 | Need | G06F 3/0227 710/1 |

(Continued)

OTHER PUBLICATIONS

Super Smash Bros. Brawl—Wikipedia, retrieved from http://web.archive.org/web/20080911152425/http://en.wikipedia.org/wiki/Super_Smash_Bros._Brawl; Sep. 22, 2008 edition, p. 1.*

(Continued)

*Primary Examiner* — Jasson Yoo
(74) *Attorney, Agent, or Firm* — Jordan IP Law, LLC

(57) ABSTRACT

Software gaming applications may be written to accept an input from one or more standard controllers such a joystick with input buttons. However, multiple wearable sensors or hand held MID devices may enhance the gaming experience. These sensors may include devices such as accelerometers to detect movement of the extremity they are attached to and wirelessly communicate this information to a receiver. Embodiments are directed to using sensor fusion to combine sensor data from multiple wireless input devices, such as wearable sensors and MID devices together to form one logical input stream that is presented to an application and which the application sees are a standard controller.

19 Claims, 2 Drawing Sheets

(56) References Cited

U.S. PATENT DOCUMENTS

2006/0179411 A1* 8/2006 Wolf .................. G06F 3/023
                                                            715/751
2008/0242415 A1* 10/2008 Ahmed ..................... 463/39
2009/0285443 A1* 11/2009 Camp et al. ............... 382/100

OTHER PUBLICATIONS

Super Smash Bros. Brawl game manual for Nintendo Wii, released Mar. 9, 2008, pp. 1-36.*

* cited by examiner

SENSOR FUSION TO COMBINE SENSOR INPUT DATA FROM MULTIPLE DEVICES INTO ONE INPUT STREAM

FIELD OF THE INVENTION

Embodiments of the present invention are directed to sensors and, more particularly, to combining data from multiple sensor input devices together to form one logical input stream that may be presented to an application.

BACKGROUND INFORMATION

Computers, game consoles, personal digital assistants, and other information appliances typically include some type of user interface through which inputs and outputs pass. Inputs from the user are often delivered through a cable from a keyboard, a mouse, a joystick, or other controller. The user actuates keys, buttons, or other switches included on the controller in order to provide input to the information appliance. The action a user takes in order to provide input to an information appliance, such as pressing a button or other input action.

In some applications it may be desirable for an input action to be driven by a particular human gesture. Specialized input devices can be used in such applications so that the user can provide command and control inputs by performing a particular gesture in direct physical contact with the input device. For example, in a dance competition game, the game prompts the user to "perform" various dance moves. A pressure sensitive pad is typically provided so that the user can perform a dance move by tapping a specified portion of the pressure sensitive pad with one of the user's feet. In this way, the input action (that is, tapping a portion of the pressure sensitive pad) captures an aspect of a dance move.

Other approaches to supplying input to an information appliance may make use of gesture recognition technology. Many mobile hand held devices include accelerometers or other sensors which may sense a user's motions or gestures. Another approach involves so-called wearable sensors that are attached to the user to measure the user's various movements. These measurements are then used to determine the gesture that the user is performing.

Currently, input devices are single components that typically feed into applications over a cable, such as a USB cable, or by wireless RF. Multiple controllers can be connected to one application, for example for multi-player games or complex control of a single game, but the multiple input streams are handling individually by the applications. Alternately, games may be custom-written to use multiple sensors, so the underlying implementation would be much less flexible.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

DETAILED DESCRIPTION

Described is a system directed to sensor fusion to combine sensor data from multiple input devices together to form one logical input stream that is presented to an application.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
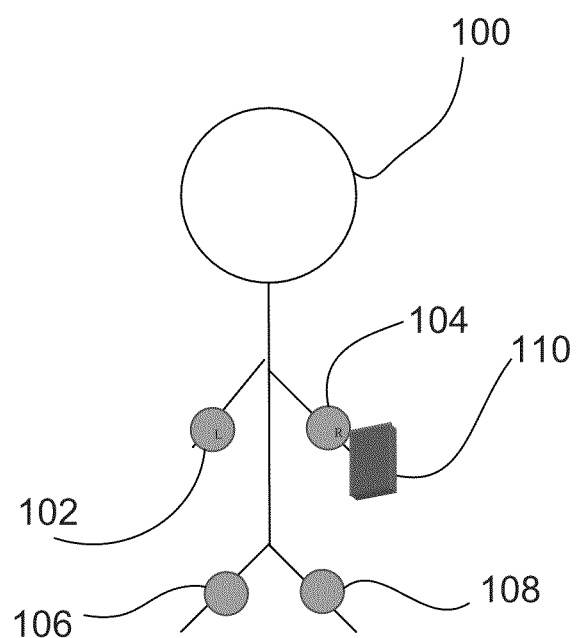
FIG. 1 is an illustration of a user donning wearable sensors to track their movements.

Referring now to the drawings and, more particularly to FIG. 1, there is shown an illustration of a user 100 donning wearable sensors on various parts of their body. For example, the user 100 may be wearing a left wrist sensor 102, a right wrist sensor 104, as well as leg sensors 106 and 108. These sensors may include devices such as accelerometers to detect movement of the extremity they are attached to and wirelessly communicate this information to a receiver. Other sensors, while not shown for simplicity, may be placed at other locations on the body 100. The user may also have a hand held device 110, which may be a mobile internet device (MID), a phone, for example, equipped with movement sensors. While one user 100 is shown there of course may be more than one user for interactive games similarly fashioned with sensors.

Embodiments of the invention are directed to using sensor fusion to combine sensor data from multiple wireless input devices, 102-110, together to form one logical input stream that is presented to an application. For an example, a user playing an interactive racing game may wish to use a MID device 110 to control the left-right movement of their car, while using their feet, with attached wearable sensors 106 and 108, to control the acceleration & deceleration of the car.

In this example, this system may comprise three separate sensors, including those of the MID 110, and two on the feet 106 and 108, while the application would expect the input from one sensor, for example a USB joystick or a keyboard, mouse, dance pad, or other peripheral device. Thus, embodiments combine data from the three independent wireless sensors into one virtual control device, as an input to an application.

Figure 2:
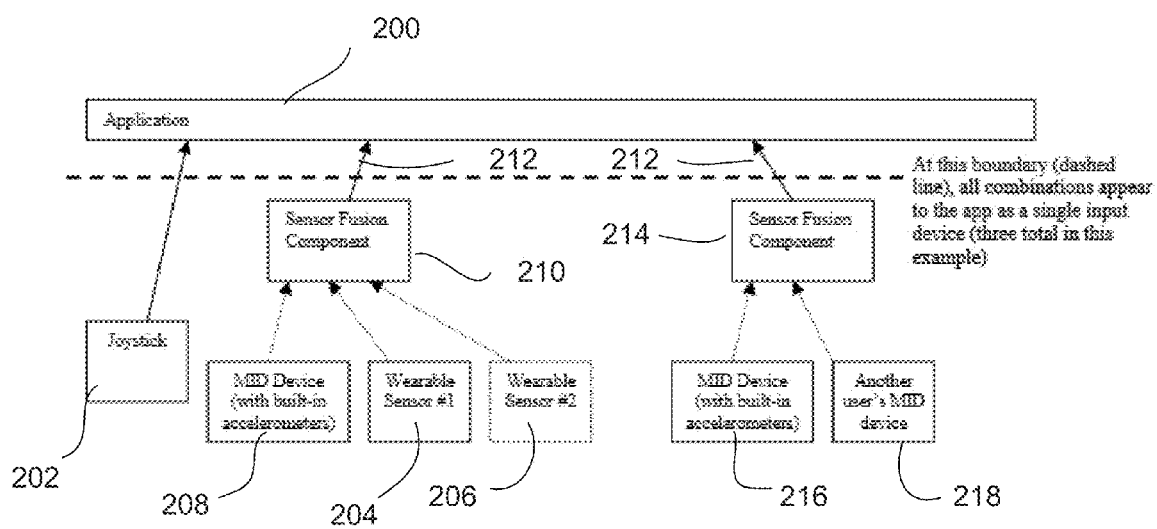
FIG. 2 is a block diagram of a sensor fusion system according to one embodiment of the invention.

Referring to FIG. 2, there is shown a diagram showing an embodiment of the invention to translate multiple sensor input devices into a single standard output stream. There are a number of different standards for Human Interface Devices (HID) in the USB specification, representing such things as joysticks, steering wheels, and any number of standard control devices. Wearable sensors, however, provide a disparate sensor stream that collect data from a number of different sources. Embodiments therefore translate the multiple sensor streams into a standard HID device, allowing distributed sensor systems to patch into existing systems.

As illustrated in FIG. 2, an application 200 may be running on a computer or special purpose computer such as a game console and the application 200 may be expecting a standard input, such as from a joystick or game controller 202 that may include a joystick and various buttons for controlling the action of the application 200. The application 200 may also accept input from more than one joystick controller 202 for multiple player games.

In addition, a user having on their person one or more wearable sensors 204 and 206, and perhaps a handheld device such as a MID 208 as described with reference to FIG. 1, may supply multiple input data indicative of the user's movements to a sensor fusion component 210. The sensor fusion component 210 acts to combine the multiple inputs such that the output 212 of the sensor fusion device 210 appears to the application 200 as a single input device, which is what the application 200 is expecting. For interactive games or applications 200 additional sensor fusion components 214 may be present to combine or fuse the inputs from another user's MID devices 216 and 218 or additional wearable sensors.

As an extension, it would also be possible to translate multiple input streams into multiple output streams, translating, for example, several wearable sensors to feed into multiple input joysticks which are used by some of the more advanced PC games. This translation component could reside in a number of different locations, depending on the topology of the system. For example, it could be part of a MID device, which collects data from a wireless personal-area-network (PAN), and supplies the combined result to a game running on the MID.

Alternatively, the data could be supplied using USB-over-IP or some similar technique to an application running on a TV set-top-box (STB). In this case, the sensor fusion could also happen at the STB itself, instead of the MID. In addition to game applications, this invention could be used for other activities such as complex information visualization, or navigation through interactive worlds. All these applications will initially be written such that they conform to existing standards for input devices such as mice, keyboards, joysticks, etc.

However, with the advent of advanced devices such as MIDs and wearable sensors, the space of potential input capabilities is starting to become much greater, necessitating some translation between distributed wireless sensing and standard single-stream input techniques.

In other embodiments, this invention may combine multiple MID devices together in a collaborative game. For example, consider a complex flight combat simulator game that involves multiple levels of control. That is, a game that is traditionally controlled by a main joystick for the flying the plane, and a thumb-manipulator for controlling the aiming of firing a missile or other action. Using this invention, this single player game could effectively be turned into a multi-player game by fusing the input form two MID devices together where, one would be controlling the plane, while the other would control the aiming of the weapon.

Again, the sensor streams from the multiple MID devices may be combined into a single stream presented to the target application as one unified device. In addition to MID devices and physically wearable sensors, this invention may also incorporate sensors such as cameras which may perform image segmentation and analysis to provide the required data stream. For example, the input from a STB camera could be combined with accelerometer data from a MID device to provide a unified input mechanism to a game or other application running on the STB; again, providing for an immersive game experience. Furthermore, for mobile devices, this technique could be used to combine different kinds of sensors (gyroscopes, accelerometers, and a digital compass) together to form a more unified interface to an application.

One consideration of this invention is the fact that an application writer doesn't necessarily know what different sensors might be available to people using the application. Some users may have just a regular joystick, while other users may have a MID device plus a complete set of wearable sensors. Or, a group of users may be together, providing an opportunity to combine sensors from multiple devices. An advantage to embodiments of the present invention is to abstract the application writer from the specific hardware and preferences of the people using the application. The variety of potential input sensors is very large, and so is the different ways in which different users would prefer/choose to use those sensors, so this basic abstraction will enable sensor- or user-specific processing to best suit the user's needs, independent of the application.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
    a processor;
    a hardware interface to receive a plurality of inputs from a plurality of input devices that are to generate sensor data not recognized by a software application as originating from a control device with which the software application is configured to operate, wherein at least one of the plurality of input devices is a wireless wearable device that includes at least one sensor, and wherein the sensor data is to represent movements associated with different parts of a user's body; and
    a non-transitory computer readable storage medium comprising a set of stored instructions which, if executed, cause the processor to fuse the sensor data from the plurality of input devices into a unified data stream that emulates sensor data originating from a single control device with which the software application is configured to operate, wherein the set of stored instructions comprises a gaming application.

2. The apparatus as recited in claim 1, further comprising:
    a plurality of wearable sensors designed to be worn on various parts of a user's body, wherein the plurality of wearable sensors are to provide at least one of the plurality of inputs.

3. The apparatus as recited in claim 2, wherein at least one of the plurality of inputs is to be provided by a wireless handheld device that includes a motion sensor.

4. The apparatus as recited in claim 1, wherein at least one of the plurality of inputs is to be provided by a wireless handheld device that includes a motion sensor.

5. The apparatus from claim 1, where the unified data stream is represented to the software component as originating from a physical controller including one of a joystick, keyboard, mouse, or dance pad.

6. The apparatus as recited in claim 1, wherein at least one of the plurality of input devices from which the hardware interface is to receive input is a camera.

7. The apparatus of claim 1, wherein at least two of the plurality of input devices are wireless hand-held devices.

8. The apparatus of claim 1, wherein at least one input from the plurality of input devices is to be provided by a wireless phone.

9. A method, comprising:
  receiving a plurality of inputs from a plurality of input devices that generate sensor data not recognized by a software application as originating from a control device with which the software application is configured to operate, wherein at least one of the plurality of input devices is a wireless wearable device that includes at least one sensor, and wherein the software application is a gaming application; and
  fusing the sensor data from the plurality of input devices into a unified data stream that emulates sensor data originating from a single control device with which the software application is configured to operate.

10. The method as recited in claim 9, wherein the single control device is a joystick.

11. The method as recited in claim 9, wherein at least one of the plurality of inputs is from one of a plurality of wearable sensors designed to be worn on a user's body.

12. The method as recited in claim 11, further including a plurality of wireless wearable devices that each includes at least one sensor.

13. The method as recited in claim 11, wherein at least one of the plurality of inputs is received from one or more of an accelerometer or a camera.

14. The method as recited in claim 9, where the unified data stream is represented to the software application as originating from a physical controller including one of a joystick, keyboard, mouse, or dance pad.

15. A system, comprising:
  a computer including a stored gaming application, wherein the gaming application is to recognize a data stream from a joystick controller;
  a hardware interface to receive a plurality of inputs from a plurality of input devices that are to generate sensor data not recognized by the gaming application as originating from a joystick controller with which the gaming application is configured to operate, wherein at least one of the plurality of input devices is a wireless wearable device that includes at least one sensor, and wherein the sensor data is to represent movements associated with different parts of a user's body; and
  a component to combine the sensor data from the plurality of input devices into a single data stream that emulates sensor data originating from a joystick controller presented to the gaming application.

16. The system as recited in claim 15, wherein at least one of the plurality of inputs is to be received from wearable sensors designed to be worn on various parts of a user's body.

17. The system as recited in claim 16, wherein at least one of the plurality of inputs is to be received from a wireless wearable sensor.

18. The system as recited in claim 15, wherein at least one of the plurality of inputs is to be received from a mobile internet device (MID).

19. The system as recited in claim 18, wherein at least one of the plurality of inputs is to be received from an accelerometer.

* * * * *